United States Patent [19]

Takagi et al.

[11] Patent Number: 4,743,788

[45] Date of Patent: May 10, 1988

[54] INPUT FREQUENCY CONTROL DEVICE FOR SURFACE ACOUSTIC WAVE MOTOR

[75] Inventors: Tadao Takagi, Yokohama; Shigemasa Sato, Tokyo; Kazuo Hakamada, Kawasaki, all of Japan

[73] Assignee: Nippon Kogaku K. K., Tokyo, Japan

[21] Appl. No.: 929,351

[22] Filed: Nov. 12, 1986

[30] Foreign Application Priority Data

Nov. 20, 1985 [JP] Japan .............................. 60-260754

[51] Int. Cl.$^4$ ........................................... H01L 41/08
[52] U.S. Cl. ................................... 310/316; 310/323; 310/328
[58] Field of Search ............... 310/314, 316, 317, 323, 310/328

[56] References Cited

U.S. PATENT DOCUMENTS

| | | | |
|---|---|---|---|
| 4,484,099 | 11/1984 | Kawai et al. | 310/323 X |
| 4,504,760 | 3/1985 | Yamamoto et al. | 310/328 X |
| 4,510,411 | 4/1985 | Hakamata et al. | 310/328 X |
| 4,513,219 | 4/1985 | Katsuma et al. | 310/328 |

FOREIGN PATENT DOCUMENTS

0204477 11/1984 Japan .................... 310/323

*Primary Examiner*—Mark O. Budd
*Attorney, Agent, or Firm*—Shapiro and Shapiro

[57] ABSTRACT

A surface acoustic wave motor utilizing ultrasonic vibration has an elastic member and piezoelectric elements for vibrating the elastic member. The motor is provided with a monitor voltage detecting circuit for detecting a monitor voltage generated by the vibration, from a portion of the piezoelectric elements not receiving the input voltage, and a frequency control circuit for controlling the input power supply frequency in such a manner that the monitor voltage assumes a predetermined value lower than a maximum monitor voltage obtained at the resonance frequency of the stator consisting of the elastic member and piezoelectric elements, in a frequency range higher than the resonance frequency.

13 Claims, 5 Drawing Sheets

INPUT FREQUENCY CONTROL DEVICE FOR SURFACE ACOUSTIC WAVE MOTOR

BACKGROUND OF THE INVENTION

1. Field of the Invention

The present invention relates to a surface acoustic wave motor utilizing ultrasonic vibration, and in particular to an input frequency control device for a surface acoustic wave motor utilizing ultrasonic vibration and provided with an elastic member and a piezoelectric member for vibrating said elastic member.

2. Related Background Art

The U.S. Pat. No. 4,510,411, issued Apr. 9, 1985, discloses an "ultrasonic motor" utilizing ultrasonic vibration and a "surface acoustic wave" motor in which a surface acoustic wave generated on the surface of an elastic member for example with piezoelectric elements drives a rotor maintained in contact with said surface, as actuators replacing the conventional electromagnetic motors. For driving such surface acoustic wave motor with a high efficiency, it has been considered necessary to match the frequency of input power supply with the resonance frequency of a stator consisting of an elastic member and piezoelectric elements.

However the present inventors have found that, in a control to drive a surface acoustic wave motor at such frequency, said resonance frequency itself fluctuates due to a variation in the torque and in various ambient conditions, therefore resulting in difficulties that (1) the motor shows unstable behavior and is unable to provide stable performance, (2) no suitable means is easily available for detecting and maintaining said resonance frequency, and (3) in particular, the performance of the motor is significantly deteriorated when the input frequency becomes lower than the resonance frequency due to the fluctuation thereof.

SUMMARY OF THE INVENTION

In consideration of the foregoing, the principal object of the present invention is to provide a surface acoustic wave motor which can be stably driven with a high efficiency even in the presence of a fluctuation in the resonance frequency of the stator due to a change in the torque or in ambient conditions.

The above-mentioned object can be achieved according to the present invention by a surface acoustic wave motor utilizing ultrasonic vibration and having an elastic member and piezoelectric elements for vibrating said elastic member, said motor being provided with voltage detection means for detecting a monitor voltage generated by the vibration, from a portion of the piezoelectric elements not receiving the input voltage, and a frequency control unit for controlling the input power supply frequency in such a manner that said monitor voltage assumes a predetermined value lower than a maximum monitor voltage obtained at the resonance frequency of the stator consisting of said elastic member and piezoelectric elements, in a frequency range higher than said resonance frequency.

A portion of the piezoelectric elements attached to the elastic member constituting the stator does not receive the input voltage, and said portion generates a voltage, called monitor voltage, corresponding to the vibration of other piezoelectric elements receiving the input voltage. The monitor voltage becomes highest when the frequency of the input power supply is equal to the resonance frequency of said stator, and becomes lower than said maximum voltage corresponding to said resonance frequency, in a frequency range higher than said resonance frequency.

The frequency control means receives said monitor voltage and automatically controls the frequency of the input power supply in such a manner that said monitor voltage reaches a predetermined value lower than said maximum voltage corresponding to the resonance frequency in a frequency range higher than said resonance frequency. In this manner it is possible to stably drive a surface acoustic wave motor with a high efficiency, even in the presence of a fluctuation in the resonance frequency of the stator, due to a variation in the torque or in the ambient conditions.

Other objects of the present invention, and the characteristics and advantages thereof, will become fully apparent from the following description to be taken in conjunction with the attached drawings.

DETAILED DESCRIPTION OF THE PREFERRED EMBODIMENTS

Figure 1:
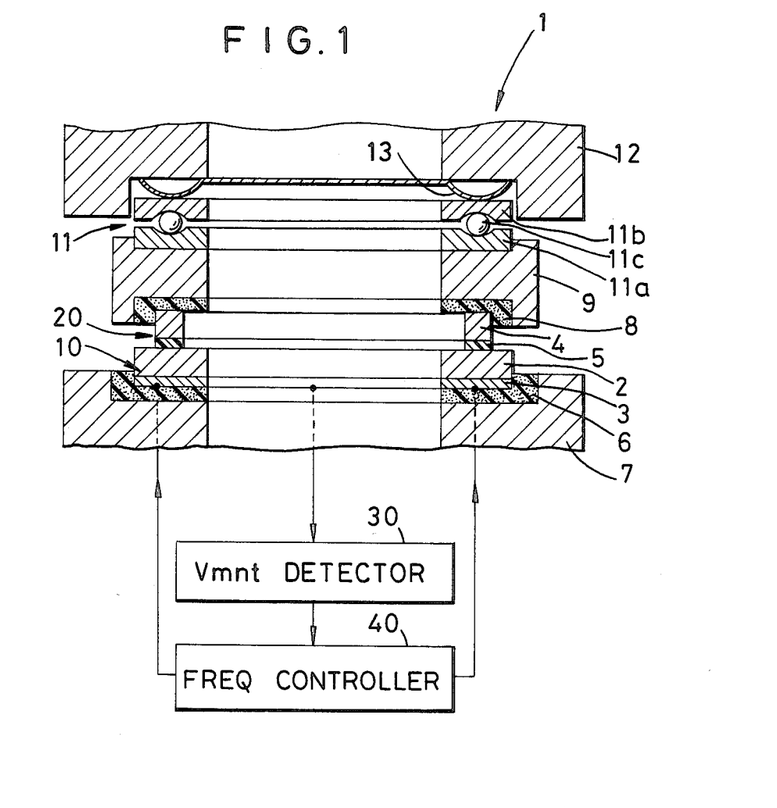
FIG. 1 is a cross-sectional view of a surface acoustic wave motor embodying the present invention.
Figure 2:
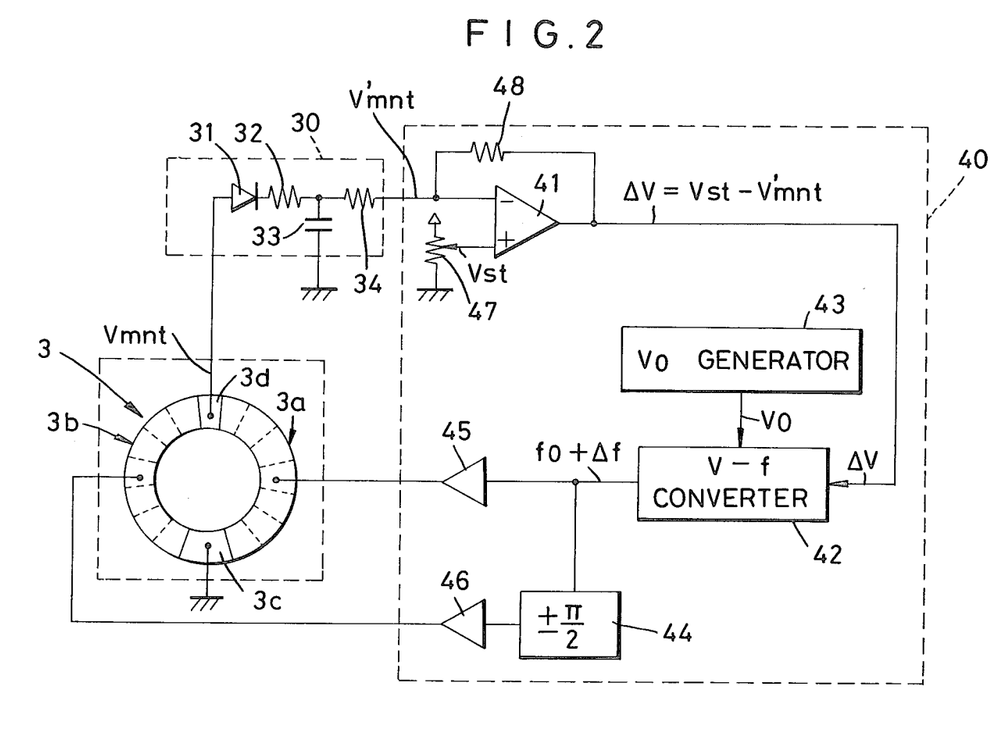
FIG. 2 is a block diagram of a control circuit for controlling the frequency of the input power supply for the embodiment shown in FIG. 1.

FIGS. 1 and 2 illustrate an embodiment of the present invention.

As shown in FIG. 1, the surface acoustic wave motor 1 is provided with an elastic member 2 and a piezoelectric member 3 for vibrating said elastic member 2. The piezoelectric member 3 is adhered to said elastic member 2 in such a manner that the vibration of said piezoelectric member 3 causes a bending motion in the elastic member 2, and said elastic member 2 and piezoelectric member 3 constitute a stator 10.

A rotor member 4 driven by the stator 10 is provided, on a face thereof opposed to the elastic member 2, with a slider coating 5 of a high friction coefficient. A rotor 20 is composed of said rotor member 4 and the slider 5.

The stator 10 is supported by a fixed member 7, through a vibration absorbing member 6 such as felt. Also the rotor 20 is supported by a rotary member 9, through a vibration absorbing member 8 such as felt. Thus the rotary force of the surface acoustic wave motor 1 is transmitted to the exterior by said rotary member 9.

On an end face of the rotary member 9 there is provided a thrust bearing 11 (11a–11c), and a spring member 13 such as a wave washer is provided between the thrust bearing 11 and the fixed member 12. The biasing force of said spring member 13 is transmitted to the rotor 20 through the thrust bearing 11, rotary member 9 and vibration absorbing member 8, whereby the slider 5 of said rotor 20 is maintained in pressure contact with the elastic member 2 of the stator 10.

FIG. 2 shows a control circuit for controlling the input frequency of an AC voltage supplied to said piezoelectric member 3.

As shown in FIG. 2, said piezoelectric member 3 is formed as a ring composed of composite piezoelectric elements of alternating polarity, and is provided, on a face thereof opposite to the elastic member 2, with four segment electrodes 3a–3d.

The segment electrode 3a receives a sinusoidal AC voltage, while the segment electrode 3b receives another sinusoidal AC voltage which is different from the first-mentioned voltage in phase by $\pi/2$. The segment electrode 3c is grounded, and the segment electrode 3d, not receiving the AC voltage, is used for detecting a monitor voltage Vmnt generated by the vibration of the piezoelectric member 3.

The control circuit shown in FIG. 2 is composed of a monitor voltage detecting circuit 30 for detecting the monitor voltage Vmnt from the segment electrode 3d as a smoothed voltage V'mnt, and a frequency control circuit 40 for controlling the input frequency f of the AC voltage suppliced to the segment electrodes 3a, 3b in such a manner that the smoothed monitor voltage V'mnt is maintained at a predetermined value in a frequency range higher than the resonance frequency of the stator 10.

The monitor voltage detecting circuit 30 is composed of a diode 31 for rectifying the monitor voltage Vmnt from the segment electrode 3d; an integrating circuit composed of a resistor 32 and a capacitor 33 for smoothing the voltage from said diode 31; and a resistor 34, and provides the smoothed monitor voltage V'mnt from said resistor 34.

The frequency control circuit 40 is composed of an operational amplifier 41; a V-f converter 42, an initial voltage generator 43; a phase shifter 44; and amplifiers 45, 46.

The inverted input terminal of the operational amplifier 41 is connected to the resistor 34 and thus receives the smoothed monitor voltage V'mnt. The non-inverted input terminal of said operational amplifier 41 is connected to a constant voltage source 47 supplying a predetermined voltage Vst higher than the monitor voltage V'mnt. Said predetermined voltage Vst serves as a target value for the smoothed monitor voltage V'mnt. Between the inverted input terminal and the output terminal of the operational amplifier 41 there is connected a resistor 48, whereby said operational amplifier 41 outputs a signal corresponding to the difference of two voltages $\Delta V = Vst - V'mnt$.

Figure 5:
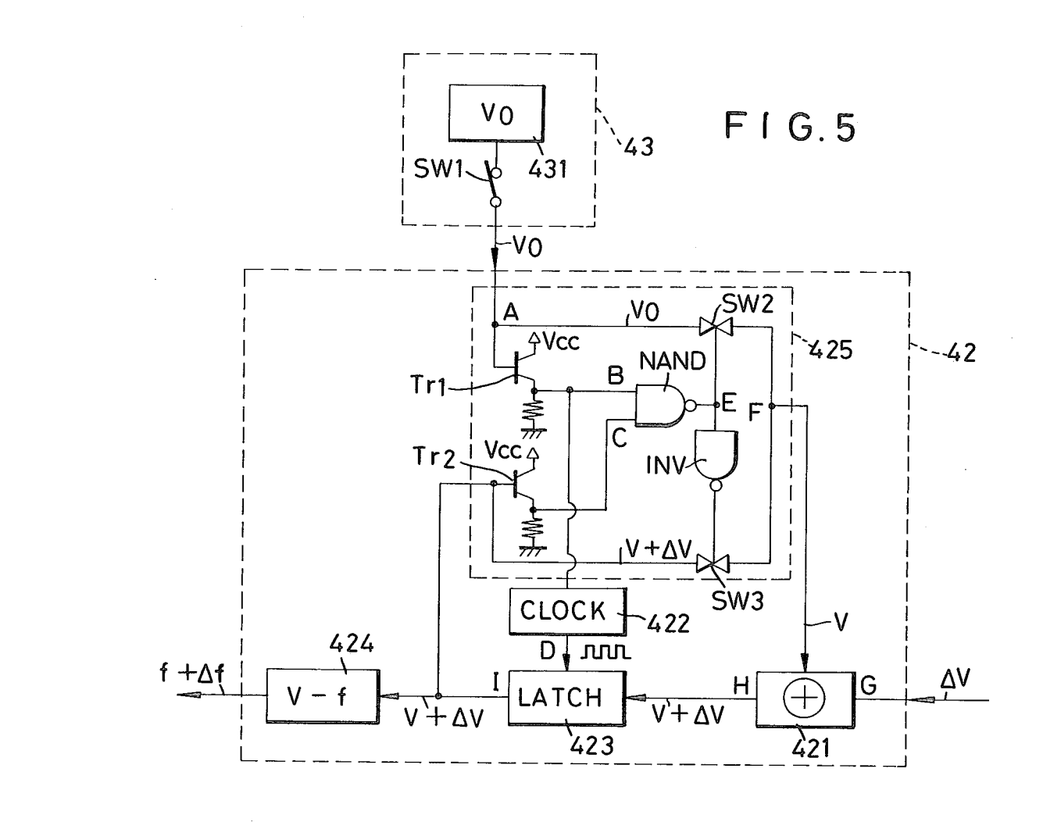
FIG. 5 is a block diagram of a V-f converter and an initial voltage generator shown in FIG. 2.

As shown in FIG. 5, the V-f converter 42 is composed of an adder 421; a clock pulse generator 422; a latch circuit 423; a V-f converting element 424; and a voltage switching circuit 425, and is adapted to calculate a shift amount $\Delta f$ of the input power supply frequency f in response to the difference signal $\Delta V$ from the operational amplifier 41 and an initial voltage V0 from the initial voltage generator 43 and to output a signal of a frequency $(f+\Delta f)$ by adding the prior frequency f of the input power supply. The detailed structure of said V-f converter 42 will be explained later in more detail.

Referring to FIG. 5, the initial voltage generator 43 is composed of a constant voltage source 431 generating a constant voltage V0 and a start switch SW1 and is adapted to supply the V-f converter 42 with the initial voltage V0 when said start switch SW1 is closed at the starting of the surface acoustic wave motor 1, thereby causing the V-f converter 42 to generate a signal (hereinafter called "maximum frequency signal") of a frequency f0 slightly higher, for example by 10%, than the maximum value, of the normal variable range, of the resonance frequency of the surface acoustic wave motor 1.

The phase shifter 44 serves to shift the sinusoidal output of the V-f converter 42 by $+\pi/2$ or $-\pi/2$ according to the rotating direction of the motor 1.

The amplifiers 45, 46 respectively amplify the outputs of the V-f converter 42 and of the phase shifter 44 and supply the segment electrodes 3a, 3b with thus amplified outputs.

Figure 3:
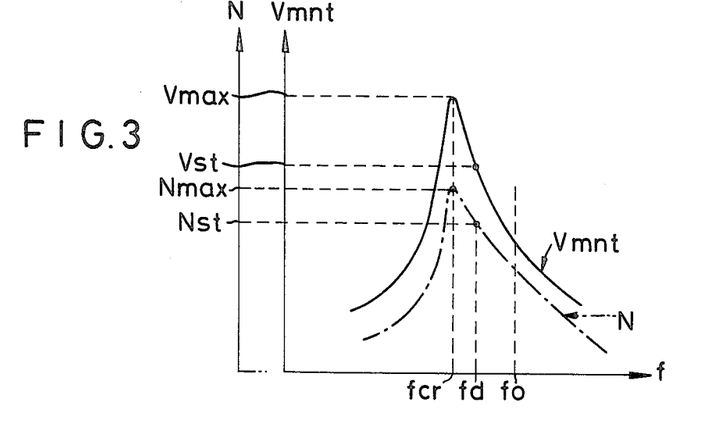
FIG. 3 is a chart showing the monitor voltage and the revolution as a function of the frequency of the input power supply in the circuit shown in FIG. 2.

FIG. 3 shows a monitor voltage curve indicating the monitor voltage Vmnt from the segment electrode 3d as a function of the input frequency f of the power supply to the segment electrodes 3a, 3b in the present embodiment, and a revolution curve indicating the revolution N of the rotor 20 as a function of said input frequency f. In FIG. 3, the revolution N and the monitor voltage Vmnt are indicated on the ordinate while the input frequency f is indicated on the abscissa.

As will be apparent from FIG. 3, the monitor voltage Vmnt has a strong correlation with the revolution N of the rotor 20, and assumes a maximum value Vmax at an input frequency $f_{cr}$ where the revolution N reaches a maximum value Nmax. Said frequency $f_{cr}$ corresponds also to the resonance frequency of the stator 10.

Conventionally it has been considered that a maximum efficiency is obtained from the motor by matching the input frequency f with the frequency $f_{cr}$ at which the revolution N of the rotor 20 reaches a maximum value Nmax or which corresponds to the resonance frequency of the stator 10, but the present inventors have conducted experiments in order to determine an ideal input frequency for the surface acoustic wave motor 1. In said experiments, the input frequency f was set at a value lower than the resonance frequency of the stator 10, and was gradually increased to a value above said resonance frequency $f_{cr}$. As the result it was found that an input frequency lower than the resonance frequency $f_{cr}$ was not adequate for example due to a rapid decrease in revolution in case of an increase in the torque. Also an input frequency equal to or approximately equal to the resonance frequency $f_{cr}$ was also found not adequate due for example to noise during rotation, a rapid decrease in the revolution in response to an increase in the torque, or a poorly reproducible and unstable behavior of the motor. On the other hand, the drive was reproducible, stable and of a high efficiency when the input frequency was higher than the resonance frequency $f_{cr}$. It was found in particular that a stable and high output could be obtained by employing a frequency $f_d$ higher than the resonance frequency $f_{cr}$ of the stator 10 and satisfying a following relation:

$$(f_d - f_{cr})/f_{cr} \approx 0.01.$$

Consequently, in the foregoing embodiment, said predetermined voltage Vst is selected equal to a monitor voltage corresponding to the ideal frequency $f_d$ which is higher than said resonance frequency $f_{cr}$ and satisfies the relation $(f_d - f_{cr})/f_{cr} \approx 0.01$.

Figure 4:
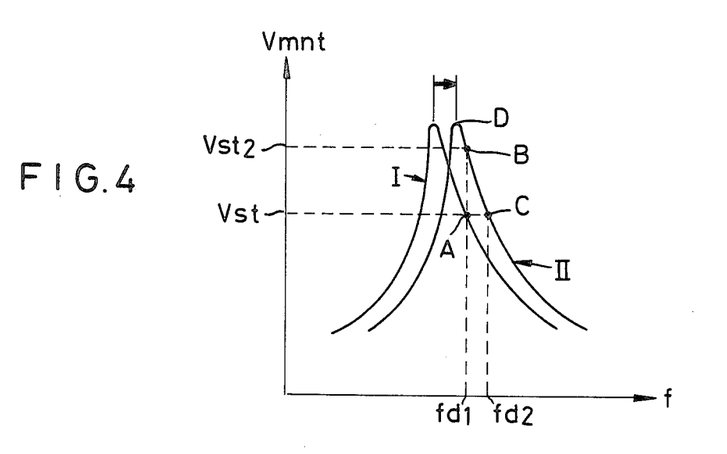
FIG. 4 is a chart showing a case of a shift in the monitor voltage curve.

FIG. 4 shows a state in which the monitor voltage curve shown in FIG. 3 is shifted, as indicated by an arrow, as the result of a variation in the motor load or in the ambient conditions. In this manner the ideal frequency $f_d$ can always be obtained automatically by the V-f converter 42, even when the monitor voltage curve is shifted.

Now reference is made to FIG. 5 for explaining the structure of the V-f converter 42 for obtaining the ideal frequency $f_d$.

The V-f converter 42 comprises an adder 421; a clock pulse generator 422; a latch circuit 423; a V-f converting element 424; and a switching circuit 425 for switching the initial voltage V0 supplied to the adder 421, to an added voltage. The latch circuit 423 latches the added voltage (V+ΔV) from the adder and supplies the same to the V-f converting element 424 in response to each pulse signal from the clock pulse generator 422. The switching circuit 425 is provided with a first analog switch SW2 for transmitting the initial voltage V0 from the initial voltage generator 43 to the adder 421; a second analog switch SW3 for feeding the added voltage (V+ΔV) from the latch circuit 423 back to the adder 421; a nand gate NAND and an inverter INV for selectively actuating said analog switches SW2, SW3; a transistor Tr1 for supplying an H-level signal to an input terminal of the NAND gate in response to the initial voltage V0; and a transistor Tr2 for supplying an H-level signal to the other input terminal of the NAND gate in response to the added voltage (V+ΔV). Thus, in response to the closing of the start switch SW1, the first analog switch SW2 is turned on to supply the initial voltage V0 to the adder 421, and, in response to the output of the added voltage (V+ΔV) from the latch circuit 423, the first analog switch SW2 is turned off and the second analog switch SW3 is simultaneously turned on, whereby said added voltage (V+ΔV) is supplied to the adder 421.

In the following there will be explained the function of the above-explained embodiment.

AC voltages different in phase by $\pi/2$ in phase supplied to the segment electrodes 3a, 3b of the piezoelectric member 3 induce a vibration therein, thus causing a bending motion in the elastic member 2. Said bending motion induces rotation of the rotor 20 as the slider 5 thereof is maintained in pressure contact with the elastic member 2 of the stator 10 by the biasing force of the spring member 13. The rotation of the rotor 20 is transmitted, through the vibration absorbing member 8, to the rotary member 9, by means of which the rotary force of the surface acoustic wave motor 1 is given to the outside.

Figure 6:
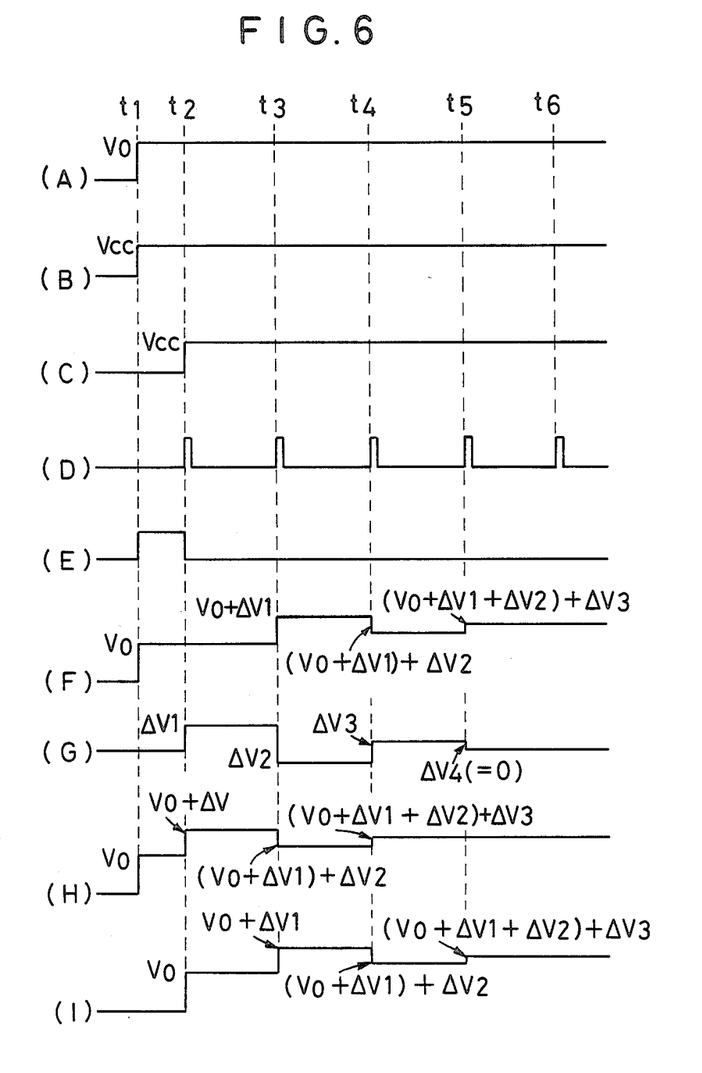
FIG. 6 is a timing chart showing the function of the circuits shown in FIG. 5.

Such motor 1 can be started by closing the start switch SW1, in response to which the initial voltage generator 43 supplies the V-f converter 42 with the initial voltage V0. Referring to FIG. 6 showing the function of the V-f converter 42, symbols (A)–(I) respectively correspond to the positions in FIG. 5.

When the start switch SW1 is closed, the point A in FIG. 5 immediately assumes a potential equal to the initial voltage V0 as shbwn in FIG. 6 (A). Then the clock pulses are supplied to the latch circuit 423 to activate the same, starting from a time t2 slightly delayed from the timing t1 of the closing of the start switch SW1, as shown in FIG. 6 (D). The potential V0 at the point A turns on the transistor Tr1, whereby a voltage Vcc is supplied to an input terminal B of the NAND gate, as shown in FIG. 6 (B). However, until said time t2, the latch circuit 423 remains inactive to generate no voltage at the point I, as shown in FIG. 6 (I), whereby the transistor Tr2 remains disabled and the other input terminal of the NAND gate does not receive any voltage. Consequently said NAND gate outputs an H-level signal at the output terminal E as shown in FIG. 6 (E), and the inverter INV outputs an L-level signal. Thus the first analog switch SW2 becomes conductive to bring the point F to the initial voltage V0 as shown in FIG. 6 (F), which is supplied to the adder 421.

At the time t1, the difference signal ΔV is equal to zero, since the operational amplifier 41 is still inactive. Consequently the adder 421 outputs the initial voltage V0 as shown in FIG. 6 (H). In response to the first clock pulse at the time t2, the latch circuit 423 supplies the V-f converter 424 with the initial voltage V0 as shown in FIG. 6 (I), and the converter 424 outputs the aforementioned maximum frequency f0, larger than the ideal frequency $f_d$, as an initial output corresponding to the initial voltage V0 (cf. FIG. 3).

The maximum frequency signal f0 is supplied to the segment electrode 3a through the amplifier 45, and to the segment electrode 3b through the phase shifter 44 and the amplifier 46, thus starting the surface acoustic wave motor 1. At the starting of the motor 1 in this manner, the segment electrode 3d generates a monitor voltage Vmnt corresponding to said maximum frequency signal f0. Because of its higher frequency than said ideal frequency fd, the monitor voltage Vmnt detected from the segment electrode 3d at the starting of the motor is smaller than the aforementioned predetermined voltage Vst, as will be apparent from FIG. 3.

The monitor voltage detected from the segment electrode 3d at the starting of the motor is rectified by the diode 31 of the monitor voltage detecting circuit 30 and smoothed by the integrating circuit composed of the resistor 32 and the capacitor 33 to obtain, from said resistor 34, the smoothed monitor voltage V'mnt for supply to the inverted input terminal of the operational amplifier 41. Since said smoothed monitor voltage V'mnt is smaller than the predetermined voltage Vst, the difference signal ΔV1 from said operational amplifier 41 is positive.

In response to the supply of the initial voltage V0 from the latch circuit 423, the transistor Tr2 is turned on to supply the voltage Vcc to the other input terminal of the NAND gate as shown in FIG. 6 (C), thus obtaining an L-level signal at the output terminal E of the NAND gate. Consequently the first analog switch SW2 becomes non-conductive, while the second analog switch SW3 becomes conductive in response to an H-level signal supplied from the inverter INV. Thus the output voltage V0 of the latch circuit 423 is fed back to the adder 421 through the point F, whereby said point F remains at a potential V0 at the timing t2 as shown in FIG. 6 (F).

Consequently the adder outputs a primary added voltage (V0+ΔV1) by adding the initial voltage V0 to the primary difference signal ΔV1 from the operational amplifier, as shown in FIG. 6 (H). Said primary added voltage (V0+ΔV1) is fed back to the adder 421 through the second analog switch SW3 at a time t3, simultaneously with the supply of the primary added voltage (V0+ΔV1) to the V-f converting element 424 from the latch circuit 423, as shown by FIG. 6 (I). In response the V-f converting element 424 calculates the shift amount Δf1 (negative) of the input frequency f1, and adds said amount to the maximum frequency $f_0$ corresponding to V0 to obtain a frequency signal (f0+Δf1).

The monitor voltage V'mnt output from the monitor voltage detecting circuit in response to said frequency (f0+Δf1) is adjusted to be slightly higher than the predetermined voltage Vst, so that the difference signal ΔV2 from the operational amplifier 41 becomes negative as shown in FIG. 6 (G). Said value ΔV2 is added, in the adder 421, to the fed-back primary added voltage (V0+ΔV1) to obtain a secondary added voltage [(V0+ΔV1)+ΔV2] which is supplied to the latch circuit 423 as shown in FIG. 6 (H).

The latch circuit 423 outputs said secondary added voltage in response to a next pulse at a time t4 as shown in FIG. 6 (I), and the V-f converting element 424 outputs a frequency f0+Δf2 corresponding to said secondary added voltage [(V0+ΔV1)+ΔV2]. The monitor voltage V'mnt corresponding to said frequency f0+Δf2 is still close to the predetermined voltage Vst, and, in response, the operational amplifier 41 generates a difference signal ΔV3 as shown in FIG. 6 (G). The difference signal ΔV3 is added to the secondary added voltage (V0+ΔV1+ΔV2) fed back to the adder 421 to obtain a tertiary added voltage [(V0+ΔV1+ΔV2)+ΔV3], which is supplied from the adder 421 to the latch circuit 423, as shown in FIG. 6 (H). The latch circuit 423 outputs said tertiary added voltage in response to a pulse at t5, as shown in FIG. 6 (I).

In response the V-f converting element 424 adds a shift amount Δf3 to the maximum frequency f0 to output a frequency signal (f0+Δf3). If the monitor voltage corresponding to said signal coincides with the predetermined voltage Vst, the operational amplifier 41 outputs a difference signal ΔV4 which is equal to zero as shown in FIG. 6(G), so that the adder 421 receives no signal. Consequently the output voltage thereafter of the adder 421 remains equal to the tertiary added voltage (V0+ΔV1+ΔV2+ΔV3) as shown at t6 in FIG. 6 (H), whereby the latch circuit 423 outputs a voltage equal to said tertiary added voltage and the V-f converting element 424 continues to output the frequency $f_d = f0 + \Delta f3$. On the other hand, if the monitor voltage V'mnt corresponding to the frequency (f0+Δf3) obtained from the V-f converting element does not reach the predetermined voltage Vst, another difference signal ΔV4 is added to the tertiary added voltage (V0+ΔV1+ΔV2+ΔV3), and the V-f converting element 424, operational amplifier 41 and added 421 are again activated to bring the monitor voltage V'mnt to the predetermined voltage Vst and reduce the difference signal ΔV to zero.

As explained in the foregoing, the input frequency f of the AC voltages supplied to the segment electrodes 3a, 3b is gradually reduced in response to the signal f0+Δf from the V-f converter, and, when said monitor voltage V'mnt increases to the predetermined voltage Vst, said signal ΔV becomes equal to zero and the input frequency f from the V-f converter 42 reaches the ideal frequency $f_d$ which is the target of the control. Said ideal frequency $f_d$ allows stable drive of the surface acoustic wave motor 1.

FIG. 4 shows a state in which the curve, indicating the monitor voltage Vmnt, is shifted as indicated by an arrow. As shown by the monitor voltage curve in FIG. 4, it is assumed that fd1 indicates an ideal frequency corresponding to the aforementioned ideal frequency fd of the target of control shown in FIG. 3. In a first state I the monitor voltage Vmnt corresponding to said ideal frequency fd1 is set at the predetermined voltage Vst to drive the motor 1 with said ideal frequency fd1, the driving point of the motor 1 is at a point A.

Then it is assumed that said first state is shifted, due to a variation in the torque or in the ambient conditions, inducing a shift of the resonance point of the stator 10, to a second state represented by a curve II. In such case, since the input frequency f still remains at the ideal frequency fd1, the driving point of the motor 1 moves from A to B, thus out of the ideal driving condition. In the case shown in FIG. 4, the driving point approaches the resonance point D farther away from the ideal driving point C, so that the driving of the motor becomes extremely unstable. On the other hand, if the driving point moves away from the resonance point D, the revolution becomes lower and the starting torque becomes smaller.

In case the driving point moves from A to B as mentioned above, the monitor voltage Vmnt detected from the segment electrode 3d increases to a value Vst2 higher than the aforementioned predetermined voltage Vst. Thus the operational amplifier 41 outputs a negative difference signal ΔV, in response to which the V-f converter 42 adds a positive shift amount Δf of the input frequency to the preceding maximum frequency to output a signal of a frequency f0+Δf.

The signal f0+Δf gradually increases the input frequency f of the AC voltages supplied to the segment electrodes 3a, 3b, and, at a driving point C where said monitor voltage V'mnt coincides with the predetermined voltage Vst, the signal ΔV supplied to the V-f converter 42 becomes zero. In this state the input frequency f supplied from the V-f converter 42 is equal to the ideal frequency fd2. In this manner, in the shifted second state represented by the monitor voltage curve II, the input frequency f becomes equal to the ideal frequency fd2 corresponding to said predetermined voltage Vst, and the motor 1 is driven stably at the ideal driving point C. In this manner the motor 1 restores the ideal driving state.

What is claimed is:

1. A surface-wave driven motor comprising:
   a stator including piezoelectric means vibrated by an AC voltage applied thereto by electrode means and an elastic member having a surface for generating a surface-wave in response to the vibration of said piezoelectric means;
   a movable member maintained in contact with said surface of said elastic member and adapted to be moved by said surface-wave;
   voltage detection means for detecting a monitor voltage generated in said piezoelectric means from a monitor area of said piezoelectric means electrically insulated from said electrode means; and
   frequency control means for controlling the frequency of said AC voltage in such a manner that said monitor voltage reaches a predetermined value lower than a maximum output voltage corresponding to the resonance frequency of said stator, in a frequency band higher than said resonance frequency.

2. A surface-wave driven motor according to claim 1, wherein said voltage detection means comprises rectifier means for rectifying said monitor voltage generated by said monitor area of said piezoelectric means, and integration means for smoothing the voltage from said rectifier means.

3. A surface-wave driven motor according to claim 1, wherein said frequency control means comprises a constant voltage source of a predetermined voltage, an operation means for determining the difference between the predetermined volatge from said constant voltage source and said monitor voltage detected by said voltage detection means and generating a corresponding difference signal, and means for modifying the frequency of said AC voltage to be applied to said piezoelectric means in response to said difference signal from said operation means.

4. A surface-wave driven motor according to claim 3, wherein said operation means comprises an operational amplifier provided with an inverted input terminal connected to an output terminal of said voltage detection means and a non-inverted input terminal connected to said constant voltage source, and said frequency modifying means comprises a voltage-frequency converter for calculating, in response to said difference signal from said operational amplifier and according to the magnitude and sign of said difference signal, an amount of shift in the frequency of the AC voltage to be applied to said piezoelectric means and generating a frequency signal by adding said shift amount of the frequency of said AC voltage.

5. A surface-wave driven motor according to claim 4, wherein said frequency modifying means further comprises an initial voltage generator supplying said voltage-frequency converter with an initial voltage, at the starting of the motor, in such a manner that said voltage-frequency converter outputs a signal of a predetermined frequency larger than the resonance frequency of said stator.

6. A surface-wave driven motor according to claim 1, wherein said frequency control means is adapted to control the frequency of said AC voltage in such a manner that the difference between the frequency of said AC voltage and said resonance frequency is substantially equal to 0.01 times said resonance frequency.

7. A surface-wave driven motor according to claim 3, wherein said predetermined voltage is lower than said maximum output voltage.

8. A surface-wave driven motor comprising:
stator means including a piezoelectric means vibrated by an AC voltage applied thereto by electrode means and an elastic member having a surface for generating a surface-wave in response to the vibration of said piezoelectric means;
a movable member maintained in contact with the surface of said elastic member and moved by said surface-wave;
means for supplying said electrode means with said AC voltage; and
control means for controlling the frequency of said AC voltage to maintain it in a frequency band higher than the resonance frequency of said stator means.

9. A surface-wave driven motor according to claim 8, wherein said control means is adapted to control said frequency in such a manner that the difference between the frequency of said AC voltage and the resonance frequency of said stator means is substantially equal to 0.01 times said resonance frequency of said stator means.

10. A surface-wave driven motor according to claim 8, wherein said AC voltage supplying means supplies, at the starting of the motor, an initial voltage having a frequency higher than said resonance frequency and thereafter the frequency of the AC voltage is controlled by said control means.

11. A surface-wave driven motor according to claim 8, wherein said control means comprises monitor means for detecting a voltage generated in said piezoelectric means.

12. A surface-wave driven motor according to claim 11, wherein said control means further comprises means for producing a constant voltage and means for comparing said voltage detected by said monitor means with said constant voltage and controlling the frequency of said AC voltage in response to said comparing means.

13. A surface-wave driven motor according to claim 12, wherein said voltage detected by said monitor means reaches a maximum output value when the frequency of said AC voltage is equal to said resonance frequency of said stator means and wherein said constant voltage is lower than said maximum output value.

* * * * *